Figure 1:
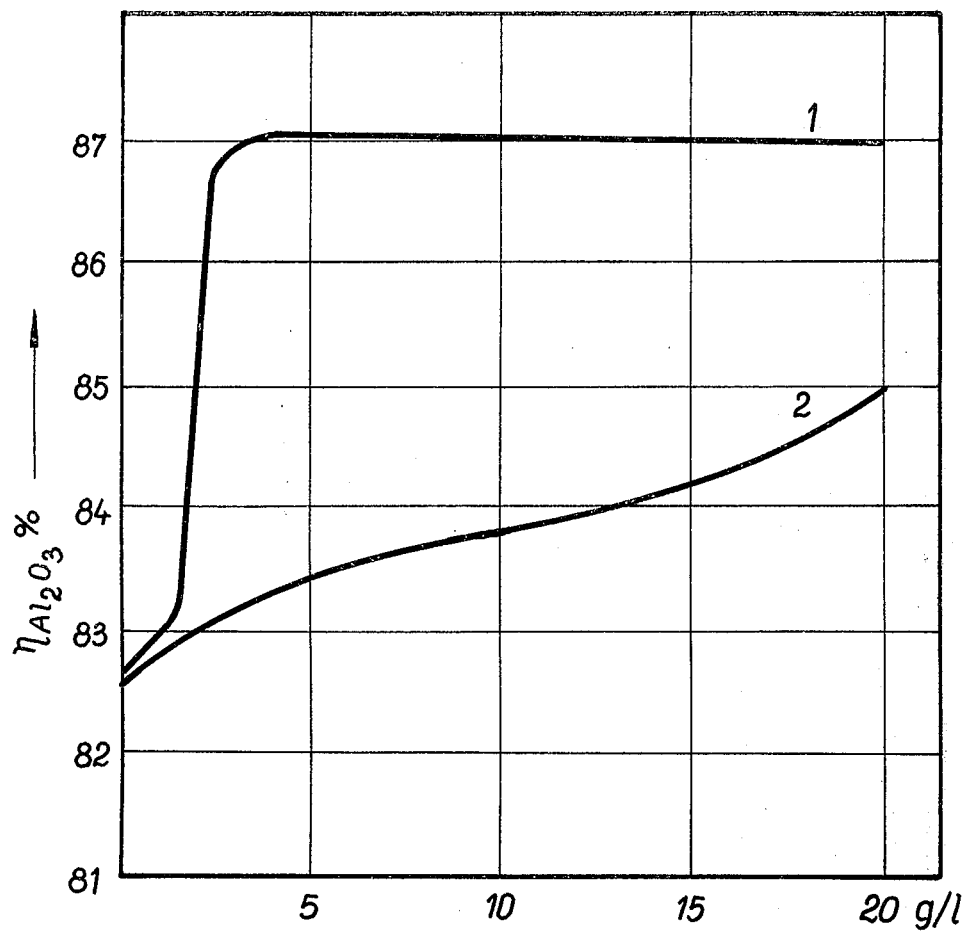

United States Patent [19]

Solymár et al.

[11] 3,944,648

[45] Mar. 16, 1976

[54] METHOD FOR PROCESSING BAUXITES

[75] Inventors: Károly Solymár; János Zámbó;
Marika Orbán née Kelemen; Érno Bujdosó; Iván Fehér; Zoltán Ozvald;
István Vörös; Tibor Ferenczi; Pál Tóth, all of Budapest; Ferenc Lázár, Tatabanya; Tihamér Pintér, Budapest; György Sigmond, Budapest; Peter Siklósi, Budapest; Kálman Wentzely, Almasfuzito; László Lengyel, Almasfuzito; József Mátyási, Almasfuzito, all of Hungary

[73] Assignees: Aluterv Aluminiumipari Tervező Vállalat; Fémipari Kutató Intézet, both of Budapest; Almásfüzitői Timföldgyár, Almasfuzito, all of Hungary

[22] Filed: July 3, 1974

[21] Appl. No.: 485,570

[30] Foreign Application Priority Data

July 7, 1973 Hungary............................... AU 308

[52] U.S. Cl............... 423/121; 423/128; 423/129; 423/131
[51] Int. Cl.² .................................................. C01F 7/06
[58] Field of Search ............ 423/121, 128, 131, 129

[56] References Cited
UNITED STATES PATENTS

| | | | |
|---|---|---|---|
| 663,167 | 12/1900 | Hall ..................................... | 423/121 |
| 1,422,004 | 7/1922 | Sherwin .............................. | 423/121 |
| 2,181,669 | 11/1939 | Scholder ............................. | 423/121 |
| 2,519,362 | 8/1950 | Flint et al. ........................... | 423/121 |
| 2,926,069 | 2/1960 | Perrin et al. ........................ | 423/121 |
| 3,210,155 | 10/1965 | Cagnolatti et al. ................. | 423/121 |
| 3,737,514 | 6/1973 | King..................................... | 423/121 |

*Primary Examiner*—Herbert T. Carter
*Attorney, Agent, or Firm*—Young & Thompson

[57] ABSTRACT

A method for processing bauxites according to the Bayer technology, with an increased yield in $Al_2O_3$ and with decreased caustic soda losses, starting particularly from goethite bauxites of boehmite and/or diaspore type and carrying out the digestion at 180°C to 300°C using an aluminate liquor containing $Na_2O_{caustic}$ in a concentration of 80 to 300 g./l. The digestion is carried out in the presence of a calcium compound in an amount corresponding to 2 to 6 % of CaO calculated for the dry weight of bauxite and of a sulfate salt in an amount corresponding to 1.0 to 7.0 g./l. of sulfate ion concentration, whereby the goethite content of the bauxite is converted into hematite. The process provides advantageous conditions for the complete dissolution of the boehmite and diaspore content of bauxite in the vicinity of the equilibrium molar ratio, and enables to recover efficiently the caustic soda losses in the Bayer process itself, requiring no supplementary operation.

7 Claims, 1 Drawing Figure

METHOD FOR PROCESSING BAUXITES

This invention relates to a method for processing bauxites. More particularly, this invention relates to a method for processing bauxites according to the Bayer technology, starting particularly from goethite-containing bauxites of diaspore and/or boehmite type.

The efficiency of the Bayer-process, according to which the majority of alumina is produced all over the world, is determined primarily by the yield of alumina with respect to bauxite ($Al_2O_3$ yield) and the losses of caustic soda during processing. The solubility of $Al_2O_3$ in alkali (i.e. the molar ratio of $Na_2O$ and $Al_2O_3$ of the digesting liquor after leaching, which is expressed in mole numbers and is termed briefly as "molar ratio"), as well as the separability, filtrability and sedimentation properties of the red mud also influence the efficiency of the process to a great extent. It is known that the sedimentation properties of goethite-containing muds are extremely poor, and that Al and V atoms may be incorporated into the crystal lattice of goethite by isomorphic substitution, which effect greatly decreases both the $Al_2O_3$ yield and the separability of $V_2O_5$.

Caustic soda losses occur, in major part, as $Na_2O$ bound in sodium aluminium silicates formed in an amount proportional to the reactive $SiO_2$ content of bauxites. In order to recover this lost $Na_2O$, in some plants the red mud is caustified.

Boehmite-diasporic type bauxites are digested, in general, at temperatures between 200° and 250°C, which is also the minimum temperature range required for converting goethite into hematite.

According to U.S. application Ser. No. 316,519, filed Dec. 19, 1972 and now abandoned in favor of Ser. No. 508,641, filed Sept. 23, 1974 the addition of NaCl and/or $Na_2SO_4$ replacing in part caustic soda is recommended in order to reduce or supplement the alkali losses. In this way about 10 to 12 % of the total $Na_2O$ loss can be supplemented.

According to the Hungarian Pat. No. 164 863, a mixture of CaO and NaCl is used in the digestion instead of CaO alone, in order to promote the conversion of goethite into hematite. This process allows to decrease both the temperature required for the goethite-hematite conversion and the molar ratio.

The process of this invention represents a considerable technical advance with respect to the above processes, since it provides conditions more advantageous for the conversion of goethite into hematite, together with the complete dissolution of the boehmite and diaspore content of bauxite in the vicinity of the equilibrium molar ratio, and enables one to recover efficiently the caustic soda losses in the Bayer process itself, requiring no supplementary operation.

This invention is based on the recognition that certain salts, primarily sulfates, exert an unexpected catalytic effect on the goethite-hematite conversion in the presence of CaO, even when used in a relatively small concentration. When CaO is used in combination with $Na_2SO_4$, the dissolution rate of aluminum ores increases abruptly, the equilibrium molar ratio can also be approximated under practical conditions, and goethite is converted into hematite. $Na_2SO_4$, even when present in a small concentration, is incorporated efficiently into the sodium-aluminium hydrosilicate product, forming a nosean-type compound, which can be decomposed instantaneously by $Ca(OH)_2$. This phenomenon enables the red mud to be caustified during washing, and to recover 50 to 60 % of the caustic soda bound therein. It has been stated that nosean (cancrinite) can be caustified within 0.5 hours with an efficiency of about 90 %, whereas under the same conditions the regenerated amount of the $Na_2O$ content of hydroxysodalite is lower than 40 % and that of carbonate-sodalite is lower than 20 %. Chloride-sodalites formed in the presence of NaCl are practically uncaustifiable. Cancrinite formation is promoted by the presence of CaO and $Na_2SO_4$ and, by an increase in the temperature of digestion. Hence, when the digestion is carried out at 240° to 245°C, in the presence of 3 to 4 % of CaO and 1 to 5 g./l. of $Na_2SO_4$, 60 to 80 % of the sodium-aluminum hydrosilicate, product of the goethite-hematite conversion (and, consequently, 60 to 80 % of the bound $Na_2O$ loss) will be present in the form of readily caustifiable cancrinite-type compounds.

On the above basis, this invention relates to a method for processing bauxites according to the Bayer technology, with an increased yield in $Al_2O_3$ and with decreased caustic soda losses, starting particularly from goethite-containing bauxites of boehmite and/or diaspore type and carrying out the digestion at 180° to 300°C using an aluminate liquor containing $Na_2O_{caustic}$ in a concentration of 80 to 300 g./l., and optionally containing 1 to 20 g./l. of NaCl. The process according to the invention is characterized in that the digestion is carried out in the presence of a calcium compound, preferably calcined lime, in an amount corresponding to 2 to 6 % of CaO calculated on the dry weight of bauxite and of a sulfate salt, preferably $Na_2SO_4$, in an amount corresponding to 1.0 to 7.0 g./l. of sulfate ion concentration, whereby the goethite content of the bauxite is converted into hematite, and, if desired, the red mud obtained is caustified by the addition of 1.0 to 2.0 moles of CaO/moles of $Al_2O_3$ or a corresponding amount of $Ca(OH)_2$ paste to the red mud.

The red mud is caustified preferably during washing.

The advantages of the simultaneous use of CaO and $Na_2SO_4$ are illustrated in FIG. 1 for the processing of a goethite-containing bauxite of boehmite type, containing 6 % of $SiO_2$. The diagram shows the effect of NaCl or $Na_2SO_4$, added in various amounts to the digesting liquor containing 3 % of CaO (calculated on the dry weight of bauxite). In the diagram the $Al_2O_3$ yield (in %) is plotted against the amount of the salts added (in g./l.). In these experiments bauxite was digested at 245°C for 30 minutes. Curve 1 refers to the use of $Na_2SO_4$ while curve 2 refers to the use of NaCl.

The alkali used in the digestion contained 223.2 g./l. of $Na_2O_{caustic}$. The molar ratio of the solution after digestion varied between 1.32 and 1.34. As it appears from the Figure, the use of $Na_2SO_4$ even in an amount of as low as 3 g./l. results in a better $Al_2O_3$ yield than the use of NaCl in an amount of 20 g./l. A significant additional advantage is that the sodium-aluminum hydrosilicates formed with the addition of $Na_2SO_4$ are well caustifiable. $Na_2SO_4$, used in an amount of 3 to 5 g./l., increases the salt level of the mixture to only a slight extent and its retarding effect on stirring is negligible. Using $Na_2SO_4$ as additive, and subjecting the nosean-type and carbonate-cancrinite type sodium-aluminum hydrosilicates to caustification in the washing step, alkali losses can be reduced by 50 to 60 %. It is to be noted that $Na_2SO_4$ when added alone, i.e. without CaO, promotes cancrinite formation to a lesser extent than in combination with CaO; in the latter case, that is, when adding also CaO the relative amount of cancrinite (nosean) is increased by a factor of about two.

The caustification of the red muds enriched in cancrinite (nosean) can be accomplished either in a separate caustifying plant or when washing the red mud, and the process takes only a short time. The process can be accomplished efficiently e.g. in the feeding container of the penultimate washing tank, wherein Ca-Al silicate is formed with a small $Al_2O_3$ loss and the mud can readily be washed in the washing operations.

CaO is used preferably in an amount not exceeding the molar ratio of $CaO/Al_2O_3 = 3$, when calculated only for cancrinite-type compounds, or in an amount not exceeding 50–70 % of the CaO content, when calculated for the total amount of Na-Al silicates. Under such conditions the lost $Na_2SO_4$ removed with the mud can also be reduced, and thus less $Na_2SO_4$ is to be continuously supplemented. One can also proceed by adding 1–2 moles of CaO pro mole of $Al_2O_3$, whereby the $Al_2O_3$ loss decreases a minimum and the total amount of CaO becomes effective.

When processing hematite-containing bauxites of boehmite or diaspore type the advantages resulting from the goethite-hematite conversion do not appear but the advantages arising from the increase in reaction rate, the decrease in the digesting time, the complete dissolution of diaspore and the nearly equilibrium molar ratio still exist, which enable one to reduce the heating temperature by 5 to 10 % and to reduce the molar ratio after digestion (i.e. to increase the efficiency of the process) by some percents. Moreover, the cancrinite formation and the favourable caustifiability of the red mud make it possible to reduce the alkali losses to a very considerable extent. This technology is particularly advantageous when digestion is carried out at higher temperatures, e.g. in a tube reactor.

The advantages resulting from the use of sulfates, particularly sodium sulfate, as additive are very surprising since according to the technical literature sulfates are regarded unanimously as unwelcome contaminations in the Bayer process. Even more surprising is the observation that sodium sulfate exerts its favourable effect in the presence of CaO even in low concentrations ranging from 3 to 4 g./l. The aluminate liquors of alumina plants contain $Na_2SO_4$ in an amount generally less than 1 g./l. since $Na_2SO_4$ present in a relatively low concentration continuously leaves the system together with the red mud. CaO and sulfate salts can be advantageously added also to liquors of NaCl content; in such systems the activity-enhancing effect of NaCl is combined with the advantages listed above.

When processing bauxites with higher silicic acid content, the main advantage resulting from the process according to the invention is a decrease in the losses in caustic soda. The process of the invention can be applied, however, with excellent results also to the processing of goethite-containing bauxites with low $SiO_2$ content. Namely, in this latter case the $Na_2SO_4$, added together with CaO, considerably shortens the time required for the goethite-hematite conversion (i.e. acts as a catalyst), reduces the required minimum temperature, and the dissolution of $Al_2O_3$ takes place even at an equilibrium molar ratio. In general, in such instances the required minimum amount of $Na_2SO_4$ in the liquor is to be adjusted only at the beginning of the procedure and, since almost no $Na_2SO_4$ is removed from the system with the red mud, one has to ensure only that the $Na_2SO_4$ content of the liquor does not drop below the required minimum through salt separation or caustification. A further advantage results from the fact that CaO can be added in a smaller excess when adding $Na_2SO_4$ in combination with CaO, and thus the formation of Ca-aluminates can be suppressed.

When applying the process of the invention one may proceed, for example, as follows. Bauxite is digested in the presence of 2 to 5 % of CaO calculated on the dry weight of bauxite (the actual amount of CaO depending on the goethite content and the bonding energy of the aluminum atoms in goethite) in a digesting liquor containing 1.0 to 20 g./l. of $Na_2SO_4$, in autoclaves heated to 180° to 250 °C, preferably to 240° to 250 °C, or in tube reactors heated to 240° to 300 °C, as commonly used in the Bayer process of the European type. The concentration of the alkali used for digesting depends principally on the economic optimum of the given Bayer process, and may vary between 180 to 300 g./l. of $Na_2O_{caustic}$. The obtained red mud is caustified with lime milk ($Ca(OH)_2$) preferably during the washing operations, and the sulfate content of the circulating liquor is maintained at a constant value by supplementing the losses.

One may also proceed by adding, instead of calcined lime and the sulfate salt, gypsum or a gypsumcontaining substance as sulfate, and adding CaO in an amount decreased by the calcium content of gypsum, because gypsum decomposes in the digesting liquor into CaO and $Na_2SO_4$ and thus it exerts the same effect as the mixture of CaO and $Na_2SO_4$.

CaO can also be added to the mixture in the form of $CaCO_3$; in this event the source of $CaCO_3$ is preferably a bauxite with calcite contaminations. At the temperature of digestion $CaCO_3$ decomposes in the liquor efficiently into $Ca(OH)_2$ and $Na_2CO_3$.

When processing bauxites contaminated with calcite and/or dolomite, the amount of CaO to be added should be decreased with the amount of CaO formed in the decaustification process of these contaminations.

According to a further advantageous method, CaO and the sulfate salt or gypsum are added to a liquor containing 1 to 20 g./l. of NaCl, or sodium chloride is substituted for a part of the sulfate salt.

The invention is further elucidated by the following non-limiting Examples.

EXAMPLE 1

As raw material, a goethite-type bauxite is used, in which about 50 % of the $Fe_2O_3$ content is in the form of goethite, and in the latter the isomorphic substitution grade of Al is about 24 mole %. This bauxite is digested for 30 minutes at 245 °C, in a liquor containing 223.2 g./l. of $Na_2O_{caustic}$, 3.5 g./l. of $Na_2SO_4$ and 3 % of CaO (calculated for the dry weight of bauxite) and having a molar ratio of 3.4. The molar ratio of the aluminate liquor is 1.32 when digesting 374.6 kg. of bauxite pro $m^3$ of digesting liquor.

A reference experiment is carried out in the same way, using 3 % of CaO (calculated on the dry weight of bauxite) as additive, but with a digesting liquor having the original low $Na_2SO_4$ content of 0.5 g./l. The chemical and mineral compositions of the bauxites and the red muds formed are summarized in Table 1. These data are also plotted in FIG. 1.

The Table and the Figure both indicate that when using 3 % of CaO in the presence of 3.5 g./l. of $Na_2SO_4$ (3 g./l. of $Na_2SO_4$ have been added to the original liquor) the total $Al_2O_3$ content of both the diaspore and the goethite is dissolved, whereas with the use of a plant liquor of low $Na_2SO_4$ content diaspore remains in part undigested and goethite is not converted. The extent of goethite-hematite conversion is 95 % in the presence of 3 % of CaO and 3.5 g./l. of $Na_2SO_4$, the specific surface area of red mud decreases from 23 m²./g. to 10 m²./g., and the $Al_2O_3$ yield increases from 82.5 % to 87.0 %. The above reduction in specific surface area of the red mud corresponds to a 30 % increase in the efficiency of filtration. Upon the addition of $Na_2SO_4$, 74 % of the Na-Al silicates present in the red mud are easily caustifiable cancrinite, whereas when using a liquor of low $Na_2SO_4$ content, the amount of cancrinite is only 43 %.

The red mud formed in the digestion carried out in the presence of 3 % of CaO and 3.5 g./l. of $Na_2SO_4$ is treated for 20 minutes with lime milk in a solution containing 300 g./l. of dry substances with a $Na_2O_{caustic}$ concentration of 4 g./l. Lime milk is applied in an amount of 3 moles of CaO per mole of $Al_2O_3$ bound in the form of cancrinite. After treatment the slurry is diluted to a dry substance concentration of 60 g./l., admixed with a solution of the same concentration, and stirred slowly for 1 hour. Thereafter the solids are filtered off and analysed. The composition of the caustified red mud is also indicated in Table 1. As appears from the Table, the efficiency of the caustification of cancrinite, comprising 74 % of the $Na_2O$ content of the mud, amounts to 81 %, that is, 60 % of the total $Na_2O$ content of the red mud has been recovered. 50 % of the sulfate content remains in the solution.

The obtained red mud contains 12.6 % of $Al_2O_3$, 43.0 % of $Fe_2O_3$, 14.7 % of $SiO_2$ and 8.8 % of $Na_2O$. In the process 85 % of the goethite is converted into hematite, and the boehmite and diaspore contents of the bauxite are completely dissolved. Accordingly, the $Al_2O_3$ yield of the process is 89 %, whereas according to the conventional Bayer process a yield of only 83 % can be obtained under the same conditions.

When using CaO in combination with NaCl (with a NaCl content of the liquor of 10 g./l.), a yield of 89 % can be reached only at 245 °C, indicating that the catalytic effect of $Na_2SO_4$ causes the minimum temperature required for the goethite-hematite conversion to drop by 10 °C.

The red mud is caustified as described in Example 1.

What we claim is:

1. A method for processing goethite-containing bauxite to aluminum hydrate according to the Bayer technology, in which bauxite is digested in sodium hydroxide and the resulting material clarified to remove red mud, with an increased yield of aluminum hydrate and with decreased losses of sodium hydroxide, comprising conducting said digestion at 200° to 250°C. in an aluminate liquor containing $Na_2O_{caustic}$ in a concentration of 80 to 300 g./l., and a calcium compound selected from the group consisting of calcium carbonate, calcium oxide, calcium hydroxide and calcium sulfate in an amount corresponding to 2 to 6% by weight of CaO calculated on the dry weight of the bauxite and a sulfate salt selected from the group consisting of sodium sulfate and calcium sulfate in an amount corresponding Table 1

| Chemical and mineral composition of bauxites and red muds | | | | | |
|---|---|---|---|---|---|
| Component, % | | Bauxite | 1st red mud 0.5 g./l. $Na_2SO_4$ + 3% CaO | 2nd red mud 3.5 g./l. $Na_2SO_4$ + 3% CaO | 3rd red mud after caustification |
| $Al_2O_3$ in | gibbsite | 25.4 | φ | φ | φ |
| | boehmite | 15.0 | 0.2 | φ | φ |
| | diaspore | 1.0 | 0.8 | φ | φ |
| | goethite | 1.4 | 2.6 | 0.2 | 0.2 |
| | hematite | 0.5 | 1.0 | 1.0 | 0.9 |
| | chamosite | 0.4 | — | — | — |
| | kaolinite | 4.2 | — | — | — |
| | sodalite | — | 6.1 | 2.6 | 2.4 |
| | cancrinite | — | 4.5 | 8.0 | 1.6 |
| | Ca-Al silicate | — | 1.4 | 1.4 | 7.3 |
| Total $Al_2O_3$ | | 47.9 | 16.6 | 13.2 | 12.4 |
| $Fe_2O_3$ in | goethite | 10.1 | 18.9 | 1.2 | 1.1 |
| | hematite | 9.6 | 21.4 | 42.3 | 38.5 |
| | chamosite | 0.7 | φ | φ | φ |
| Total $Fe_2O_3$ | | 20.4 | 40.3 | 43.5 | 39.6 |
| $SiO_2$ | | 6.0 | 11.4 | 12.2 | 11.1 |
| $TiO_2$ | | 2.5 | 4.9 | 5.4 | 4.9 |
| Ignition losses | | 21.8 | 9.9 | 7.8 | 8.8 |
| $Na_2O$ | | — | 8.6 | 8.5 | 3.1 |
| CaO | | 0.5 | 7.0 | 7.2 | 18.6 |
| $SO_3$ | | — | 0.2 | 1.0 | 0.4 |
| Others | | 0.9 | 1.1 | 1.2 | 1.1 |
| $Al_2O_3$ yield | | — | 82.5 | 87.0 | 86.0 |

EXAMPLE 2

Goethite-type bauxite, containing 50.1 % of $Al_2O_3$, 6.4 % of $SiO_2$ and 18.7 % of $Fe_2O_3$ (55 % of which is present in the form of goethite), is digested for 1 hour at 235 °C in a digesting liquor with a molar ratio of 3.4, containing 220 g./l. of $Na_2O_{caustic}$, with the addition of 3 % of CaO and 4 g./l. of $Na_2SO_4$. For each m³ of the digesting liquor, 275 kg. of bauxite are added.

to 1.0 to 7.0 g./l. of sulfate ion concentration, whereby the goethite content of the bauxite is converted into hematite.

2. A method as claimed in claim 1, in which said sulfate salt is calcium sulfate and the amount of said calcium compound is decreased by the CaO content of said calcium sulfate.

3. A method as claimed in claim 1, in which calcium carbonate is added in the form of a calcite-containing bauxite.

4. A method for processing goethite-containing bauxite to aluminum hydrate according to the Bayer technology, in which bauxite is digested in sodium hydroxide and the resulting material clarified to remove red mud, with an increased yield of aluminum hydrate and with decreased losses of sodium hydroxide, comprising conducting said digestion at 200° to 250°C. in an aluminate liquor containing $Na_2O_{caustic}$ in a concentration of 80 to 300 g./l., and calcined lime in an amount corresponding to 2 to 6% by weight of CaO calculated on the dry weight of the bauxite and sodium sulfate in an amount corresponding to 1.0 7.0 g./l. of sulfate ion concentration, whereby the goethite content of the bauxite is converted into hematite.

5. A method as claimed in claim 4, in which said aluminate liquor contains sodium chloride in a concentration of 1 to 20 g./l.

6. A process as claimed in claim 4, in which said temperature is about 235° to 245°C.

7. A process as claimed in claim 4, in which said digestion is performed in an autoclave.

* * * * *